(12) United States Patent
Royle

(10) Patent No.: US 6,802,330 B2
(45) Date of Patent: Oct. 12, 2004

(54) AUTO-RELIEVING PRESSURE MODULATING VALVE

(75) Inventor: Stephen Dale Royle, Mankato, MN (US)

(73) Assignee: Mico, Inc., North Mankato, MN (US)

(*) Notice: Subject to any disclaimer, the term of this patent is extended or adjusted under 35 U.S.C. 154(b) by 0 days.

(21) Appl. No.: 10/647,585

(22) Filed: Aug. 25, 2003

(65) Prior Publication Data

US 2004/0035477 A1 Feb. 26, 2004

Related U.S. Application Data

(62) Division of application No. 09/976,383, filed on Oct. 11, 2001, now Pat. No. 6,609,538.

(51) Int. Cl.[7] ............................................. F15B 13/044
(52) U.S. Cl. .................................. 137/12; 137/625.65
(58) Field of Search ............................ 137/12, 625.65

(56) References Cited

U.S. PATENT DOCUMENTS

| | | |
|---|---|---|
| 4,079,753 A | 3/1978 | Popp |
| 4,478,250 A | 10/1984 | Lukasczyk et al. |
| 4,615,358 A | 10/1986 | Hammond et al. |
| 4,969,487 A | 11/1990 | Suzuki et al. |
| 5,117,869 A | 6/1992 | Kolchinsky |
| 5,163,477 A | 11/1992 | Takano et al. |
| 5,251,671 A | 10/1993 | Hiroki |
| 5,284,220 A | 2/1994 | Shimizu et al. |
| 5,299,600 A | 4/1994 | Aronovich |
| 5,339,777 A | * 8/1994 | Cannon ................ 137/625.65 |
| 6,105,616 A | 8/2000 | Sturman et al. |

FOREIGN PATENT DOCUMENTS

| | | |
|---|---|---|
| EP | 0 369 412 A2 | 5/1990 |
| EP | 0 573 191 A1 | 12/1993 |

OTHER PUBLICATIONS

"ATS Proportional Pressure Reducing/Relieving Valve", *CEC*, 7896–4, 2 pages (Oct. 25, 1995).
"Proportional Valves. Proportional Pressure Regulator Valves", *Waterman Hydraulics*, pp. 31–32 (Date Unknown*).
"Pressure Reducing and Relieving Valves (Dumps) with Proportional Control", *Comatrol*, pp. 1–2 (Date Unknown*).
"Solenoid Proportional Valve", *Sterling Hydraulics*, pp. 126–127 (Date Unknown*).
"Valve Assembly", *MICO*, Part No. X5119–71, X5119–70, 2 pages (Nov. 4, 1997).
"EPRV2–8 Proportional pressure reducing–relieving valve", *Vickers (now Eaton Corp.)*, pp. 20–21 (Date Unknown*).

* cited by examiner

Primary Examiner—Gerald A. Michalsky
(74) Attorney, Agent, or Firm—Merchant & Gould P.C.

(57) ABSTRACT

An auto-relieving pressure modulating valve includes a spool, a solenoid that shifts the spool in an energized direction, and a spring arrangement. The spring arrangement functions to shift the spool from a relieving position to a neutral position, in the energized direction, without energizing the solenoid.

5 Claims, 8 Drawing Sheets

AUTO-RELIEVING PRESSURE MODULATING VALVE

CROSS-REFERENCE TO RELATED APPLICATIONS

This application is a divisional of application Ser. No. 09/976,383, filed Oct. 11, 2001, now U.S. Pat. No. 6,609,538; which application is incorporated herein by reference.

FIELD OF THE INVENTION

This disclosure concerns a solenoid valve assembly. More specifically, this disclosure describes a solenoid actuated brake or actuator assembly.

BACKGROUND OF THE INVENTION

A wide variety of electrohydraulic pressure reducing and relieving valves are used to provide controlled pressure to hydraulic actuators and brake cylinders, for example. Some typical valves are designed for use with a proportional electric solenoid, which generates a thrust force proportional to the electrical current fed to the solenoid. The size and cost of the proportional solenoid are a function of the force output and the stroke over which this force output is available. Thrust force of proportional solenoid valves is proportional only within a predetermined stroke length. For a given size and cost, the predetermined proportional stroke length may be exceeded, but only with reduced force. Thus, to maximize the force capability of a proportional solenoid valve, it is desirable to maintain the stroke length within the proportional range. Typical proportional solenoid valves have moving armatures that travel farther than the proportional stroke range. Farther travel in the valve is desirable to provide for quicker activation or release of a working unit by increasing the flow rate through the valve body. Moving the armature as far over as possible in an activation or release position increases the flow rate. The problem is that as the stroke of the armature exceeds the proportional range, the thrust force rapidly decreases. Therefore, current designs are limited in providing adequate flow rate due to the constraint of the relationship between stroke length and force output.

In general, improvement has been sought with respect to such valve arrangements, generally to better accommodate increasing overall valve spool and armature travel while maintaining proportional stroke length to maximize force output.

SUMMARY OF THE INVENTION

One aspect of the present invention relates to a solenoid valve assembly having an auto-relieving valve arrangement that utilizes the maximum stroke length and force output of a proportional solenoid valve while providing added stroke travel to increase flow rate capacity without exceeding the solenoid's proportional range.

Another aspect of the present invention relates to a valve arrangement having a biasing component that biases a spool in an energized direction, from a relieving position to a neutral position, without energizing a solenoid.

BRIEF DESCRIPTION OF THE DRAWINGS

The accompanying drawings, which are incorporated in and constitute a part of this specification, illustrate embodiments of principles of this disclosure and, together with the description, serve to explain these principles.

DETAILED DESCRIPTION

With reference now to the various drawing figures in which identical elements are numbered identically throughout, a description of various exemplary aspects of the present invention will now be provided.

Figure 1:
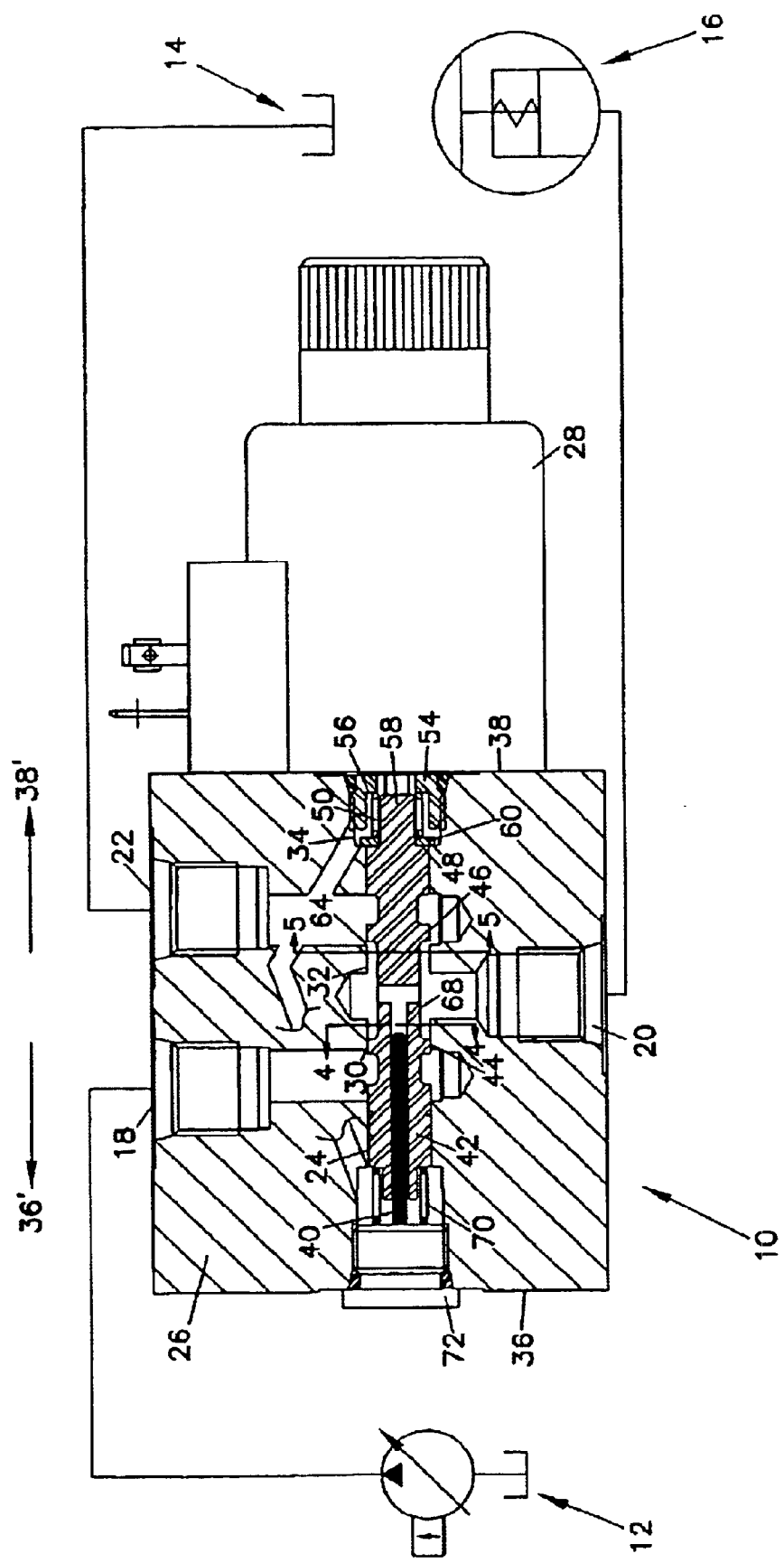
FIG. 1 is a cross-sectional view of one embodiment an auto-relieving valve arrangement shown in a neutral position according to the principles of this disclosure.

FIG. 1 illustrates, in cross-section, one embodiment of a valve assembly 10 according to the principles of this disclosure. In general, the valve assembly 10 includes a valve body 26 coupled to a solenoid assembly 28. Typically, the valve assembly 10 is used in conjunction with a hydraulic pressure unit or hydraulic pump 12, a hydraulic reservoir or tank 14, and a working unit 16 such as, for example, a hydraulic cylinder or brake.

For purposes of clarification, the valve assembly 10 will be described as having a first end 36 and a second end 38. Also, the valve assembly 10 will be described as having components moving in an energized direction 36' and a de-energized direction 38'. The energized direction 36' is opposite the de-energized direction 38'.

The valve body 26 of the valve assembly 10 includes a bore 24, a pressure port 18, a work port 20, and a tank port 22. The bore 24 typically extends through the valve body 26. Each of the ports 18, 20 and 22 are in fluid communication with the bore 24. In the illustrated embodiment, the pressure port 18 is disposed proximate the first end 36 and the tank port is disposed proximate the second end 38. The work port 20 is disposed intermediate the pressure and tank ports 18, 22. As shown schematically in FIG. 1, the ports 18, 20, and 22 provide connection locations for establishing fluid communication between the valve body 26 and the hydraulic pump 12, the working unit 16, and the tank 14. Typical port connections include standard SAE straight threads or other configurations for allowing hoses or other conduits to be connected between the components.

Alternative embodiments having other port configurations are contemplated, for example, the pressure port 18 may be disposed proximate the second end 38 and the tank port 22 may be disposed proximate the first end 36. A second embodiment, which discloses another alternative configuration, is described in detail below.

The bore 24 includes a first annular surface 30 and a second annular surface 32. These surfaces cooperate with the solenoid assembly to direct fluid communication between the ports 18, 20, and 22 as the solenoid assembly is energized and de-energized. The bore 24 also includes a countersink region 34. In the illustrated embodiment, the counter sink region 34 is proximate the second end 38.

Figure 2:
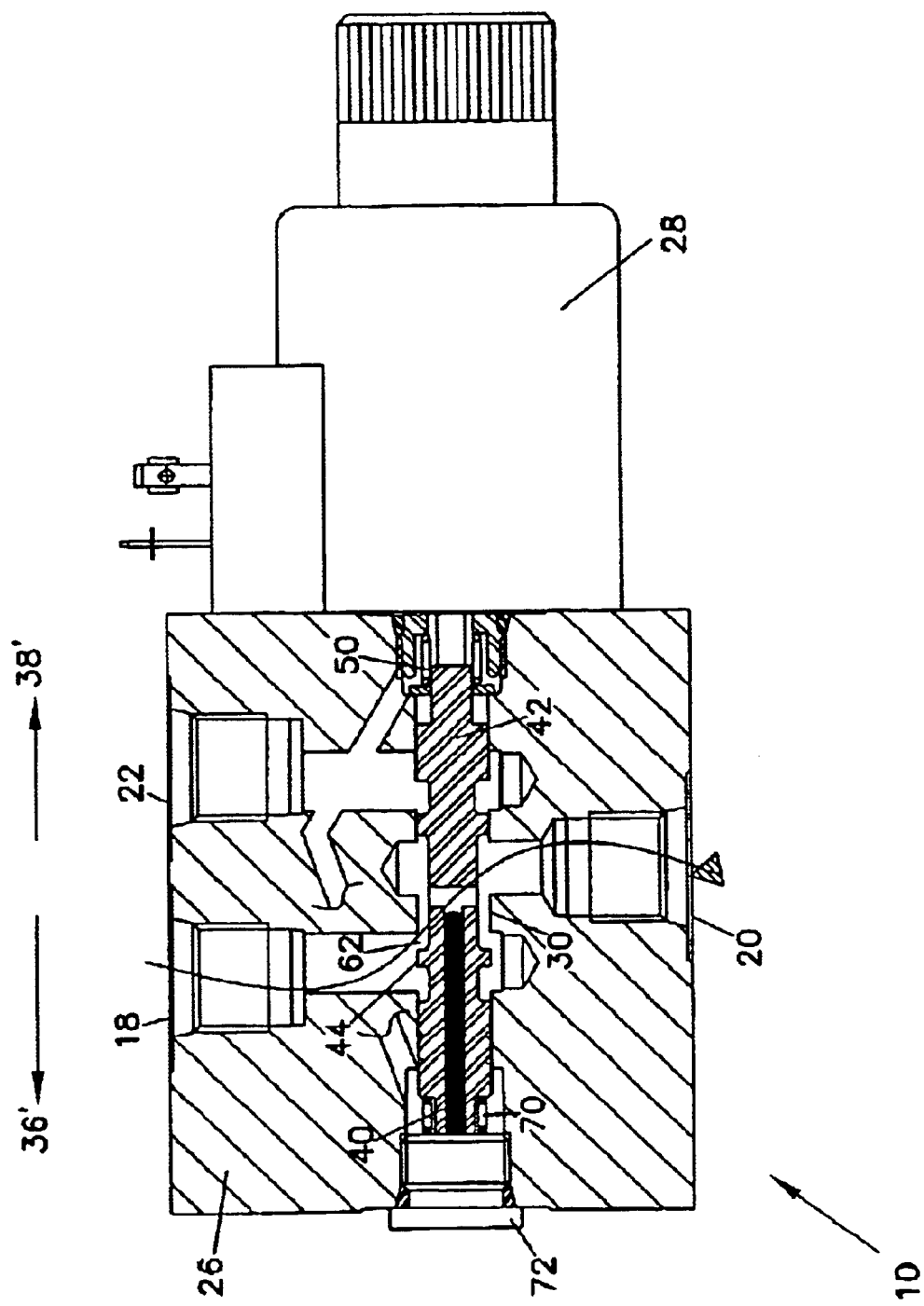
FIG. 2 is a cross-sectional view of the auto-relieving valve arrangement of FIG. 1, shown in an energized position.

The bore 24 is configured to receive a spool 42 of the solenoid assembly 28. The solenoid assembly 28 generally includes an armature (not shown), such as a common coil and iron core armature. The spool 42 is coupled to the armature so that when the solenoid assembly 28 is energized, the spool 42 moves in accordance with the armature from a de-energized neutral position to an energized position. The neutral position and the energized position of the spool 42 are shown in FIGS. 1 and 2 respectively. In the illustrated neutral position of FIG. 1, fluid communication is provided between the work port 20 and the tank port 22. The energized position (shown in FIG. 2), provides fluid communication (as shown by the arrow) between the pressure port 18 and the work port 20. It is to be understood that the solenoid may operate in the alternative where, for example, the energized position provides fluid communication between a work port and a tank port and the neutral position provides fluid communication between a pressure port and the work port.

The spool 42 includes a first annular portion 44 and a second annular portion 46. The annular portions 44 and 46 are configured to coincide with the first and second annular surfaces 30 and 32 of the bore 24. The spool 42 also comprises a shoulder 48 proximate the second end 38 of the valve assembly 10.

In the illustrated embodiment, the valve assembly 10 includes a spring 50 and a spring retaining member 54. The retaining member 54 may be an extended portion of the solenoid assembly 28 or a separate valve assembly component. The spring 50 is positioned within the countersink region 34 of the bore 24. The spring 50 may comprise a variety of compression spring configurations. Other spring types that may be used include bevel springs, torsion springs with levers, leaf springs, and the like.

The spring retaining member 54 is configured with an interior shoulder 56. The spring 50 is positioned longitudinally between the shoulder 48 of the spool 42 and the interior shoulder 56 of the retaining member 54. The retaining member 54 functions as a stationary component against which the spring 50 is compressed. In the illustrated embodiment, the spool 42 includes an extended portion 58 having an inside diameter sized to guide the spring 50. The extended portion 58 maintains the spring 50 in a longitudinal orientation.

In the illustrated embodiment, a washer 60 is disposed between the shoulder 48 of the spool and the spring 50. The washer 60 provides a mechanical stop to the spring compression. Additionally, the washer 60 functions to define the neutral position of the spool 42. As shown in FIG. 1, the washer 60 contacts the bottom of the countersink region 34 due to tension from spring 50 acting directly on the washer 60. The washer 60 also contacts the shoulder 48 of spool 42 due the tension from spring 70 acting on the spool 42. The tension from spring 70 is somewhat less than the tension provided by spring 50 when the valve arrangement 10 is in the neutral position. The washer 60 therein defines the neutral position of the valve assembly 10 such that the starting position for the proportional stroke of the solenoid assembly 28 is uniform in manufacture, regardless of minor variations in the tension provided by springs 70 and 50. Likewise, the washer 60 defines a neutral position gap 64 between the work port and tank port, which will be discussed in detail below.

It is to be understood that spring compression may be adapted to various applications by modifying the length of the spring retaining member, the thickness of the washer, the stiffness of the spring, or other various structural features as would be obvious to one of ordinary skill in the art.

In the illustrated embodiment, the bore 24 is manufactured as a through bore extending through the valve body 26. It is contemplated that the bore 24 may also be configured as a blind bore. A threaded cap or plug 72 is positioned proximate the first end 36 within the bore 24 of the valve assembly 10. The plug 72 functions as a stationary component in operation with a dowel 40 and the relative movement of the spool 42.

Figure 5:
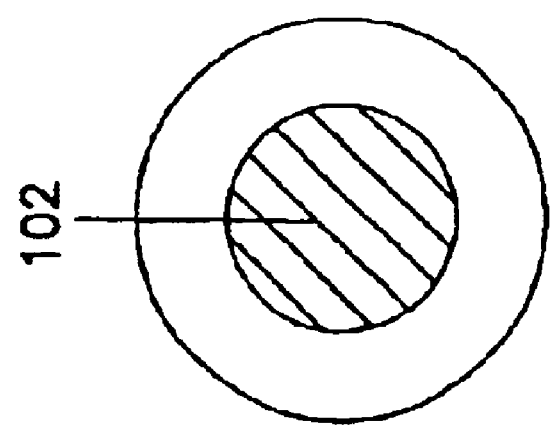
FIG. 5 is a cross-sectional view of the spool taken along line 5—5 shown in FIG. 1.
Figure 4:
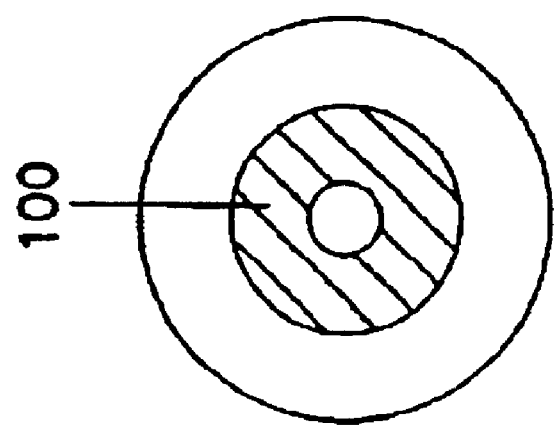
FIG. 4 is a cross-sectional view of a spool taken along line 4—4 shown in FIG. 1.

The spool 42 is operatively arranged with the dowel 40 so as to slide relative to the dowel 40. The presence of the dowel 40 causes a first surface area 100 of the spool, (shown in FIG. 4) to be less than an opposing surface area 102 of the spool 42 (shown in FIG. 5). These surface areas 100 and 102 create an unbalanced pressure load on the spool 42 when the valve body is pressurized. This unbalanced pressure load biases the spool 42 in the de-energized direction 38'.

Typically, the valve assembly 10 includes a feedback component or return spring 70. In the illustrated embodiment, the return spring 70 is retained by the plug 72 and biases the spool 42 in the de-energized direction 38'. The spring 70 acts to return the spool 42, relative to the dowel 40, to the neutral position (shown in FIG. 1) when the solenoid valve 28 is de-energized. The spring may comprise any standard spring commonly used and known by those having skill in the art or any other feed-back device such as pneumatic struts, electromagnets, or elastomeric force feedback devices. Alternatively, the return spring 70 may be omitted in applications where the unbalanced work port pressure alone is used to return the spool to the neutral position. The remainder of this disclosure will discuss operation of this embodiment including the return spring 70. It is to be understood that an embodiment omitting the return spring operates in similar fashion in accordance with the principles disclosed.

In use, when pressurized fluid is desired to operate the working unit 16, the solenoid valve 28 is energized. The solenoid begins developing axial force from the neutral position shown in FIG. 1. The solenoid valve 28 shifts or moves the spool 42 in the energized direction 36' to the energized position shown in FIG. 2. In the energized position, pressurized fluid is permitted to flow from the pressure port 18 around a flow portion 68 of the spool 42 having a decreased diameter and to the work port 20 for operation of the working unit 16. At the same time, fluid flow to the tank port 22 is obstructed by a close fit between the second annular surface 32 of the valve body 26 and the second annular portion 46 of the spool 42.

The pressurized fluid acts on the imbalanced surface areas 100 and 102 of the spool 42. As the pressure increases, the pressure force approaches the solenoid force and the spool 42 begins to move in the de-energized direction 38'. Spool movement in the de-energized direction 38' increases fluid communication with the tank port 22 and decreases fluid communication with the pressure port 18, thereby causing pressure at the work port 20 to stabilize or drop. With pressure drop, net force in the energized direction 36' exceeds net force in the de-energized direction 38' causing movement in the energized direction 36'. Spool movement in the energized direction 36' decreased fluid communication with the tank port 22 and increases fluid communication with the pressure port 18. This process or cycle causes "modulation" (i.e. back and forth movement) of spool 42. During modulation, the solenoid remains energized. The spool modulates until the pressure force and spring force 70 is balanced against the solenoid force. At steady state equilibrium, (when the kinematic energy forces resulting from a changes in solenoid current or brake pressure have subsided) the spool 42 will attain a stabilized position where fluid flow from the pressure port to the work port equals the fluid flow from the work port to the tank port.

Figure 3:
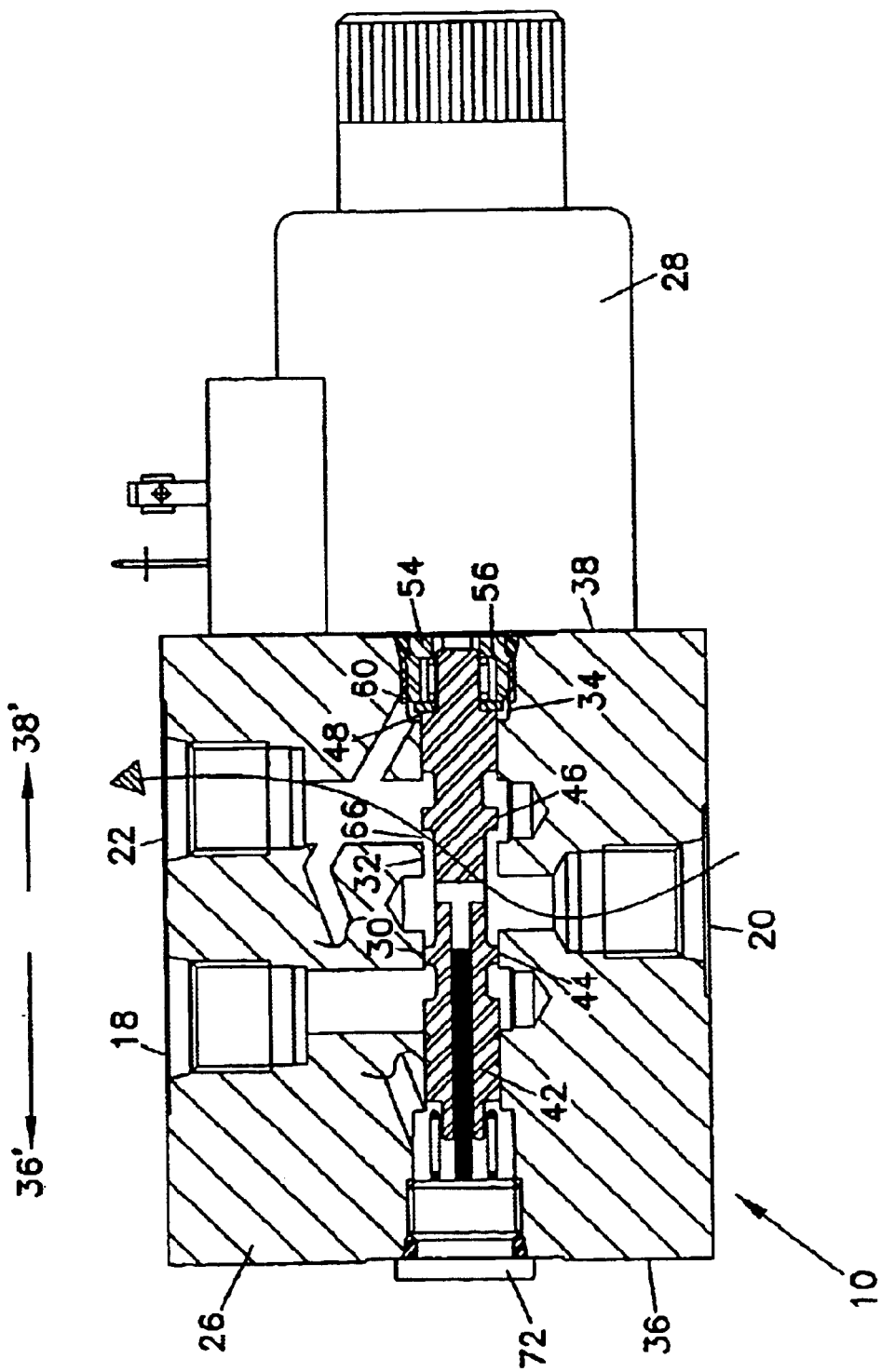
FIG. 3 is a cross-sectional view of the auto-relieving valve arrangement of FIG. 1, shown in a relieving position.

Upon desired release of the pressurized fluid, the solenoid valve 28 is de-energized and no longer produces solenoid force in the energized direction 36'. The spool 42 moves in the de-energized direction 38' by the imbalance of pressure force and the force from the return spring 70. At the neutral position there is still significant residual work port pressure, as the spool 42 has not traveled far enough to accommodate sufficient relieving fluid flow. The combination of the return spring force, and the force resulting from the residual work port pressure compresses the opposing spring 50 to allow the spool 42 to move beyond the neutral position to the relieving position (as shown in FIG. 3). In the relieving position, pressurized fluid is permitted to rapidly flow from the work port 20 around the flow portion 68 of the spool 42 and to the tank port 22.

As the fluid is released, the fluid pressure force acting to compress spring 50 decreases. The spring 50 eventually overcomes the combined forces and shifts the spool 42 forward to the neutral position shown in FIG. 1. In this position, the necessary fluid flow need only accommodate leakage from the pressure port 18 into the bore 24 to prevent unwanted pressure buildup from actuating the working unit 16. The washer 60 contacting the bottom surface of the countersink area 34 determines the neutral position of the spool.

Referring back to the energized position of FIG. 2, fluid communication is provided from the pressure port 18 through a pressure port gap 62 between the first annular portion 44 of the spool 42 and the annular surface 30 of the valve body 26. Likewise, as shown in FIG. 1, when the spool 42 is in the de-energized, neutral position, fluid communication is provided to the tank port 22 through a neutral gap 64. Further, referring now to FIG. 3, the spool 42 is shown in a full exhaust or relieving position wherein a relieving gap 66 provides for fluid communication from the work port 20 to the tank port 22. The relieving gap 66 has a cross-sectional area that is greater than the neutral gap 64. The neutral gap 64 need only accommodate a minimal flow rate to prevent unwanted build up of pressure in a brake line of a working unit 16, for example. The relieving gap 66 is greater than the neutral gap 64 to accommodate a greater flow rate for rapid release of the working unit 16.

The cross-sectional area of the fill relieving gap 66 may be several times greater in cross-sectional area than the neutral gap 64. In the illustrated embodiment, the cross-sectional area of the relieving gap 66 is about 1.5 to 3.5 times greater. It is contemplated that in larger applications, the ratio between the relieving gap and the neutral gap can be up to 20 times greater. Accordingly, the flow rate through the relieving gap 66 is likewise greater than the flow rate through the neutral gap 64.

The required flow rate from the work port 20 to the tank port 22 is determined by the amount of flow required in the application, for example, the amount of flow necessary to disengage a hydraulic actuator or hydraulic brake within an acceptable amount of time. For a given spool configuration, the open area or gap providing for fluid communication between ports is a function of spool stroke or spool travel. Greater flow rates require greater cross-sectional flow areas or gaps and therein require the spool to travel farther to increase the area of the gap. Similarly, when the solenoid is first energized the required flow rate from the pressure port 18 to the work port 20 is determined by the amount of flow required in the application, for example, the amount of flow necessary to actuate a hydraulic brake within an acceptable amount of time.

In conventional designs, the required flow rate from work port to tank port defined and fixed the neutral position; and the stroke equaled the sum of the travel required to accommodate the needed flow rate from the pressure port, any small overlap required to minimize leakage, plus the travel required to accommodate the needed flow rate to the tank port. In other words, the neutral position in conventional designs is traditionally also the fully released position.

In accordance with the principles disclosed, the stroke of the illustrated embodiments need only include the travel necessary to accommodate the pressure port flow rate, any small overlap required to minimize leakage, plus a minor opening sufficient to handle steady state or equilibrium leakage from the work port to tank port. The proportional stroke length of the valve assembly 10 is not limited or depleted by having to account for travel to accommodate the required flow rate to the tank port. Therein, the valve assembly 10 provides increased flow rate capacity for a given spool size, or proportional solenoid stroke length, not attainable by traditional arrangements. In the alternative, the valve assembly 10 may incorporate a smaller solenoid assembly to minimize cost or size of the valve assembly for a particular given flow rate capacity.

To further explain, when the solenoid 28 is switched from an energized state to a de-energized state, the pressurized fluid from the work port 20 works in combination with the return spring 70 to bias the spool 42 in the de-energized direction 38'. Upon solenoid de-energization, the immediate work port fluid pressure is greatest. The combined pressure force and return spring 70 force move the spool 42 to the relieving position shown in FIG. 3, and at the same time compress the spring 50 in the de-energizing direction 38'. The relieving gap 66, which exhausts the pressurized fluid, is maximized to provide quick release or engagement of the working unit.

When the work port pressure begins to equalize with the tank port pressure, the spring 50 returns the spool to the neutral position in the energized direction 36', without assistance from the solenoid. In other words, the spool 42 travels from a first de-energized position to a second de-energized position. This configuration and arrangement in essence shifts the neutral position of the valve assembly 10 forward from the first de-energized position to the second de-energized position. By shifting the neutral position forward, maximum stroke length and thrust force are available to shift the spool 42 to an energized position having greater flow capacity.

In typical prior art configurations, a fixed stroke length determined the valve's flow rate capabilities, i.e., a user requiring quicker exhausting capability would have to sacrifice input capability. In the present invention, the exhausting capability is maximized without sacrificing input capability by action of the spring 50 shifting the neutral position forward. In other words, the arrangement provides greater actual stroke length without jeopardizing proportional travel and maximum thrust force.

Figure 6:
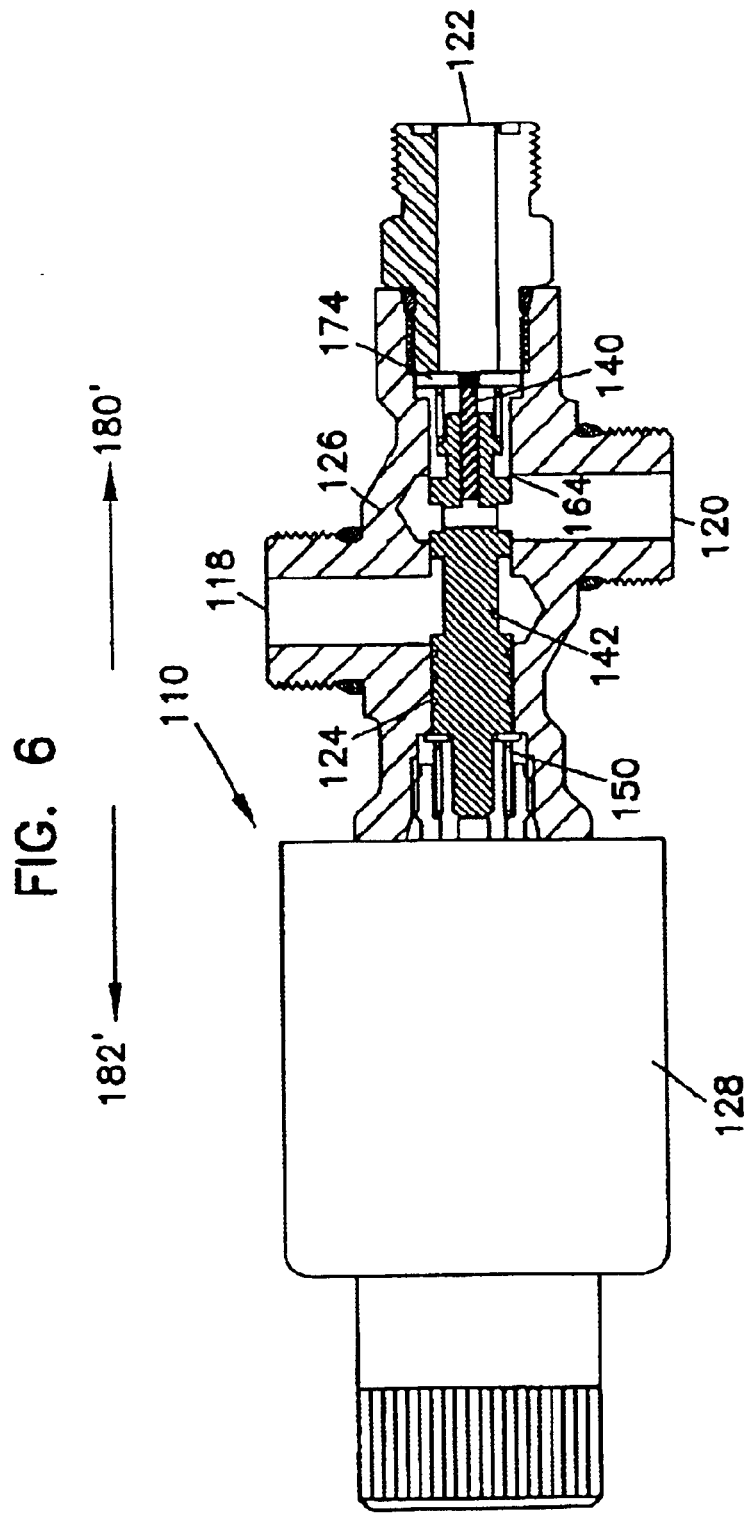
FIG. 6 is a cross-sectional view of another embodiment of an auto-relieving valve arrangement shown in a neutral position according to the principles of this disclosure.

FIG. 6 depicts, in cross-section, a second embodiment of a valve assembly 110 according to the principles of this disclosure. In general, the valve assembly 110 includes a valve body 126 coupled to a solenoid assembly 128. The valve body 126 of the valve assembly 110 includes a bore 124, a pressure port 118, a work port 120, and a tank port 122. In this port configuration, the tank port 122 extends from the bore 124; however, the overall principles of operation of this second configuration are similar to those disclosed in the first embodiment.

Figure 10:
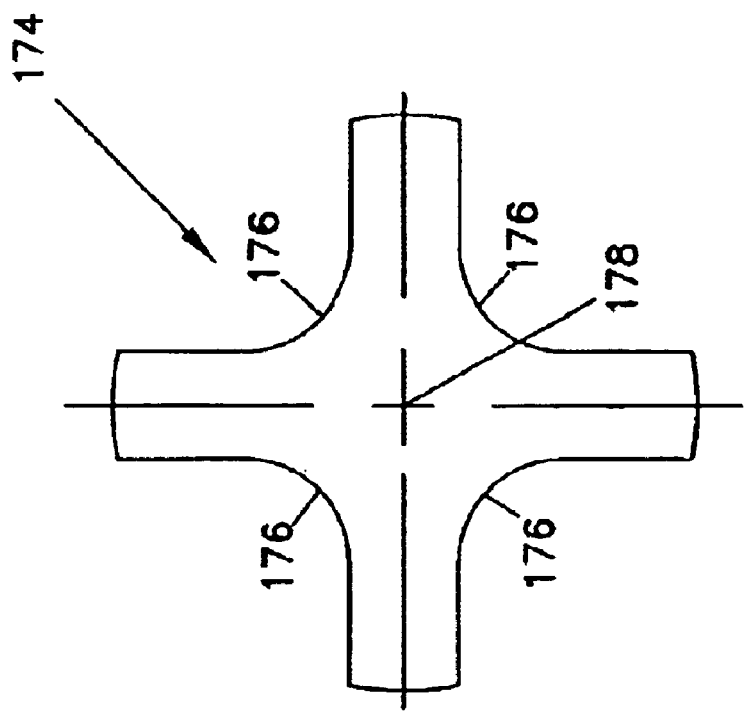
FIG. 10 is a front view of the washer of FIG. 9.
Figure 9:
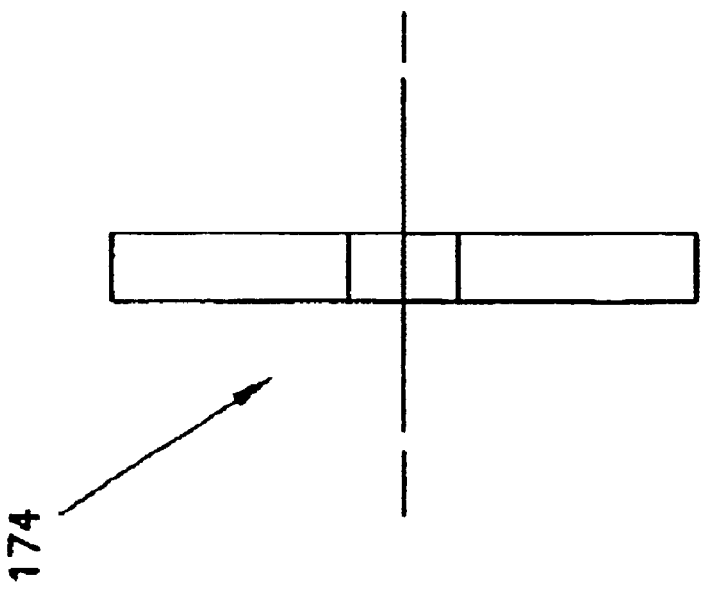
FIG. 9 is a side view of the washer shown in FIG. 6.

When the spool 142 is in the de-energized neutral position (shown in FIG. 6), fluid communication is provided from the work port 120 to the tank port 122 through a neutral gap 164. A cross-shaped washer or component 174 accommodates fluid communication to the tank port 122 in this embodiment. As best shown in FIGS. 9 and 10, the cross-shaped component 174 includes recessed portions 176 through which fluid flows. The cross-shaped component 174 functions to provide a stationary center surface 178 against which the dowel 140 may act. This permits unbalanced pressure forces to bias the spool 142 in the de-energized direction 182' relative to the dowel 140, as discussed previously.

Figure 7:
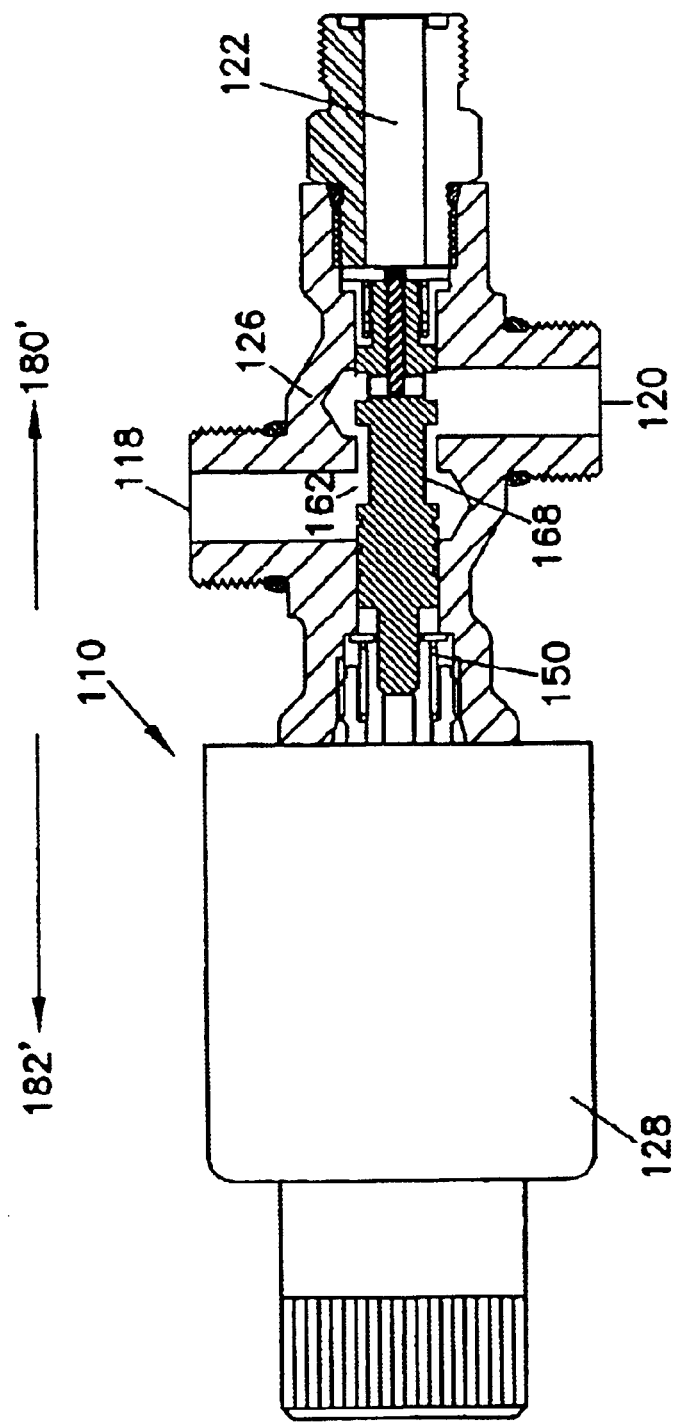
FIG. 7 is a cross-sectional view of the auto-relieving valve arrangement of FIG. 6, shown in an energized position.

In accordance with the principles disclosed, FIG. 7 illustrates the valve assembly 110 in an energized position. Fluid communication is provided from the pressure port 118 through a pressure port gap 162 and around a flow portion 168 of the spool 142, to the work port 120.

Figure 8:
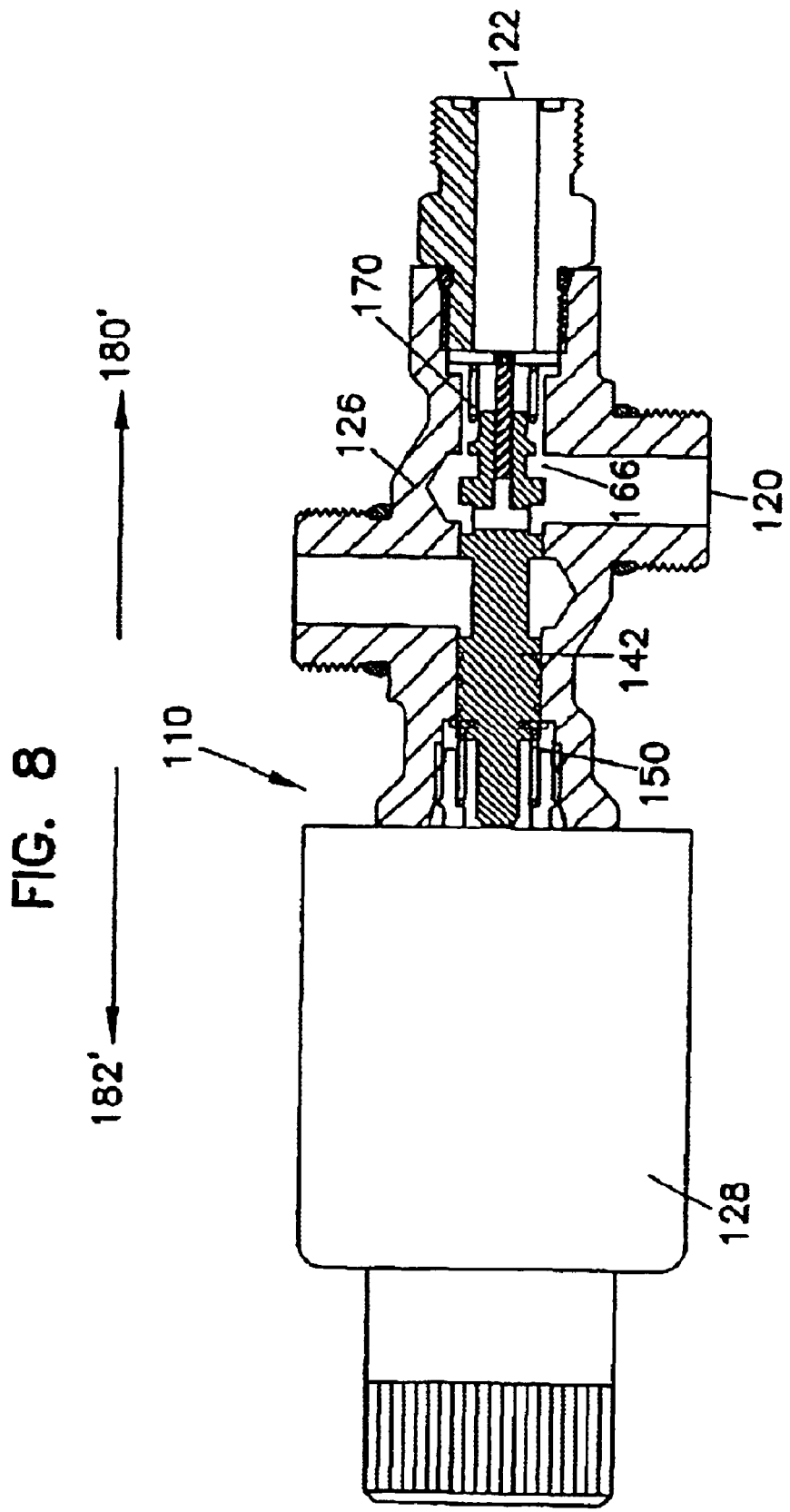
FIG. 8 is a cross-sectional view of the auto-relieving valve arrangement of FIG. 6, shown in relieving position.

Upon desired release of the pressurized fluid, the solenoid valve 128 is de-energized. Return spring 170 and the imbalance of pressure forces move the spool 142 to a relieving position shown in FIG. 8. The combination of the return spring force, and the force resulting from the residual work port pressure compresses opposing spring 150 to allow the spool 142 to move beyond the neutral position to the relieving position. (As discussed previously, the return spring 170 may be omitted.) In the relieving position, the relieving gap 166 provides a greater cross-sectional area than the neutral gap 164 for rapid fluid flow from the work port 120 to the tank port 122. As fluid is exhausted, the fluid pressure force acting to compress spring 150 decreases. The spring 150 eventually overcomes the combined forces and shifts the spool 142 in the energized direction 180' to the neutral position (shown in FIG. 6), without having to energize the solenoid 128. Overall, this second embodiment provides all the advantages in accordance with the principles disclosed by the first embodiment. Additionally, the second embodiment is beneficial by reducing manufacturing operations. Specifically, one port, i.e. the tank port 122, is configured as an extension of the valve body bore 124 and therein eliminates machining a separate tank port.

The above specification and examples provide a complete description of the manufacture and use of the composition of the invention. Since many embodiments of the invention can be made without departing from the spirit and scope of the principles disclosed, the invention resides in the claims hereinafter appended.

I claim:

1. A method of controlling fluid flow in a valve arrangement, the valve arrangement including a valve body having a pressure port, a work port, and a tank port, a solenoid device coupled to the valve body, and a spool operably coupled to the solenoid device, the method comprising:

(a) pressurizing the work port by energizing the solenoid device and moving the spool a first distance from a neutral position to a pressurized position;

(b) relieving the work port by de-energizing the solenoid device and moving the spool a second distance to a relieving position, the second distance being greater than the first distance, the valve arrangement being configured to provide a first gap for fluid communication between the work port and the tank port when the spool is in the relieving position, the first gap of the valve arrangement having a first cross-sectional area; and (c) moving the spool, without energizing the solenoid device, from the relieving position to the neutral position, the valve arrangement being configured to provide a second gap for fluid communication between the work port and the tank port when the spool is in the neutral position, the second gap of the valve arrangement having a second cross-sectional area, the first cross-sectional area of the first gap being greater than the second cross-sectional area of the second gap.

2. The method of claim 1, wherein the first cross-sectional area of the first gap is up to 20 times greater than the second cross-sectional area of the second gap.

3. The method of claim 1, wherein the first cross-sectional area of the first gap is about 1.5 to 3.5 times greater than the second cross-sectional area of the second gap.

4. The method of claim 1, wherein the second cross-sectional area of the second gap is sized and configured to accommodate leakage from the pressure port into the valve arrangement to prevent unwanted pressure buildup within the work port.

5. The method of claim 1, wherein the valve arrangement includes only one solenoid valve.

\* \* \* \* \*